US010528947B2

(12) United States Patent
Sheerin

(10) Patent No.: US 10,528,947 B2
(45) Date of Patent: Jan. 7, 2020

(54) LOCKING AN ONLINE ACCOUNT BASED ON A PUBLIC CRYPTOCURRENCY ADDRESS

(71) Applicant: Howard H Sheerin, Scottsdale, AZ (US)

(72) Inventor: Howard H Sheerin, Scottsdale, AZ (US)

( * ) Notice: Subject to any disclaimer, the term of this patent is extended or adjusted under 35 U.S.C. 154(b) by 715 days.

(21) Appl. No.: 15/331,877

(22) Filed: Oct. 23, 2016

(65) Prior Publication Data

US 2018/0082268 A1 Mar. 22, 2018

Related U.S. Application Data

(63) Continuation-in-part of application No. 15/277,974, filed on Sep. 27, 2016, which is a continuation-in-part of application No. 15/268,612, filed on Sep. 18, 2016.

(51) Int. Cl.
*G06Q 20/40* (2012.01)
*G06Q 20/06* (2012.01)

(52) U.S. Cl.
CPC ......... *G06Q 20/4014* (2013.01); *G06Q 20/06* (2013.01); *G06Q 20/065* (2013.01); *G06Q 20/405* (2013.01); *G06Q 20/4012* (2013.01); *G06Q 2220/00* (2013.01)

(58) Field of Classification Search
None
See application file for complete search history.

(56) References Cited

U.S. PATENT DOCUMENTS

| 7,712,655 | B2 | 5/2010 | Wong |
| 8,332,920 | B2 | 12/2012 | Kass |
| 8,639,628 | B2 | 1/2014 | Popp |
| 8,788,389 | B1 | 7/2014 | Fernandes |
| 2013/0097427 | A1 | 4/2013 | Billings et al. |

(Continued)

OTHER PUBLICATIONS

Eric Larcheveque, "Bitcoin Address Authentication Protocol (BitID)", GitHub, https://github.com/bitid/bitid/blob/master/BIP_draft.md, Feb. 8, 2016.

(Continued)

*Primary Examiner* — Patrick McAtee
*Assistant Examiner* — Jason B Fenstermacher

(57) ABSTRACT

A method of configuring an online account of a user is disclosed. A service provider receives a public cryptocurrency address from a user's computer and associates the public cryptocurrency address with the online account of the user. The service provider establishes a secure communication session between the user's computer and the service provider based on the user logging into a first area of the online account of the user. After establishing the secure communication session, the service provider determines that a second area of the online account is in a locked state. The service provider determines that the user has reduced a balance associated with the public cryptocurrency address during the secure communication session, and in response to determining that the balance associated with the public cryptocurrency address has been reduced during the secure communication session, unlocks the second area of the online account.

10 Claims, 15 Drawing Sheets

(56) References Cited

U.S. PATENT DOCUMENTS

| | | | |
|---|---|---|---|
| 2014/0136382 A1* | 5/2014 | Orttung | G06F 21/40 |
| | | | 705/35 |
| 2014/0245396 A1 | 8/2014 | Oberheide et al. | |
| 2015/0120546 A1 | 4/2015 | Fernandes | |
| 2016/0005032 A1 | 1/2016 | Yau et al. | |
| 2016/0162897 A1 | 6/2016 | Feeney | |
| 2016/0203572 A1 | 7/2016 | McConaghy et al. | |
| 2016/0277439 A1* | 9/2016 | Rotter | H04L 63/0861 |
| 2016/0283920 A1 | 9/2016 | Fisher et al. | |
| 2016/0292396 A1 | 10/2016 | Akerwall | |
| 2018/0225466 A1* | 8/2018 | Ducatel | G06Q 20/065 |

OTHER PUBLICATIONS

Steve Gibson, "Secure Quick Reliable Login", Gibson Research Corporation, https://www.grc.com/sqrl/sqrl.htm, Aug. 2, 2015.

* cited by examiner

LOCKING AN ONLINE ACCOUNT BASED ON A PUBLIC CRYPTOCURRENCY ADDRESS

CROSS-REFERENCE TO RELATED APPLICATIONS

This application is a continuation-in-part of U.S. patent application Ser. No. 15/277,974, filed on Sep. 27, 2016, entitled "CONFIGURING AN ONLINE ACCOUNT BASED ON A PUBLIC CRYPTOCURRENCY ADDRESS," which is a continuation-in-part of U.S. patent application Ser. No. 15/268,612, filed on Sep. 18, 2016, entitled "CRYPTOCURRENCY LOCK FOR ONLINE ACCOUNTS," which are hereby incorporated by reference in their entirety.

BACKGROUND

There is a well-known desire to maintain security of certain online accounts, particularly financial accounts such as bank accounts, credit card accounts, brokerage accounts, currency exchange accounts, online gaming accounts, etc., as well as other types of accounts that may store valuable information, such as hospital databases, legal databases, etc., or infrastructure accounts, such as utility services, military services, etc. Conventionally an online account may be protected with certain login information, which may be as simple as a user_name/password, or may be more sophisticated, such as two-factor authentication which augments the user_name/password with a verification code transmitted to a user's cell phone.

The service providers responsible for maintaining the online accounts typically employ complex security measures to safeguard the login information to prevent hackers from breaking into and stealing funds and/or valuable information from the accounts. Nevertheless, there is always the possibility and actual instances of hackers circumventing the safeguards employed by service providers leading to theft from online accounts. There is also the possibility and actual instances of hackers discovering a user's login information from the users themselves, such as through email phishing techniques and other forms of nefarious communication and malware. There is, therefore, a need to improve the security measures employed to safeguard online accounts of any kind.

BRIEF DESCRIPTION OF THE DRAWINGS

FIG. 9A shows an example wherein a first public cryptocurrency address is initialized by the service provider by transferring ten cents from a second public cryptocurrency address.

FIG. 9B shows an example wherein a user unlocks an online account by transferring six cents from the first public cryptocurrency address to a third public cryptocurrency address.

DETAILED DESCRIPTION

Figure 1A:
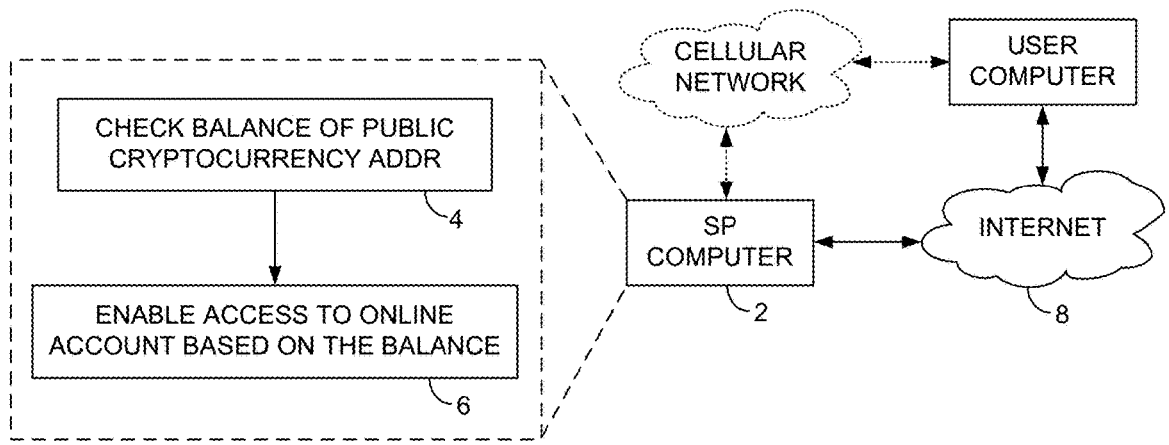
FIG. 1A shows a computer according to an embodiment for executing a flow diagram, wherein a balance associated with a public cryptocurrency address is checked using the Internet, and access to at least part of an online account is enabled based on the checked balance of the public cryptocurrency address.

FIG. 1A shows a computer 2 according to an embodiment configured to manage an online account by executing the flow diagram as shown, wherein a balance associated with a public cryptocurrency address is checked (block 4) using the Internet 8, and access to at least part of the online account is enabled based on the checked balance of the public cryptocurrency address (block 6).

Any suitable cryptocurrency may be employed in the embodiments disclosed herein, such as bitcoin or ethereum. The characteristics and implementation of a suitable cryptocurrency, such as bitcoin, are well known. In general, a cryptocurrency is a medium of exchange using cryptography to secure the transactions and to control the creation of additional units of the currency. A public database referred to as a blockchain is maintained by servers on the Internet in order to verify, facilitate, and record every transaction. The distributed nature of the blockchain over multiple nodes in the network together with a suitable form of timestamping (e.g., proof-of-work) ensures the security and authenticity of the database. Each unit of cryptocurrency (e.g., each bitcoin or fraction of bitcoin) is assigned to a public cryptocurrency address that is recorded in the blockchain, wherein the unit of currency may be transferred out of the public address (e.g., to another public address) using a private cryptocurrency key held by the current "owner" of the unit. In addition, the current balance of any particular public cryptocurrency address may be checked by any entity by executing a query of the blockchain database. In the embodiments described herein, these general characteristics of a cryptocurrency are exploited in order to increase the security of accessing any suitable online account.

An online account is any account that may be accessed over a network of computers, such as the Internet or a cellular network. Examples of online accounts include, but is not limited to, bank accounts, credit card accounts, brokerage accounts, currency exchange accounts, online gaming accounts, etc., as well as other types of accounts that may store valuable information, such as hospital databases, legal databases, etc., or infrastructure accounts, such as utility services, military services, etc. In one embodiment, a cryptocurrency may be used to augment the security information used to access an online account, such as augmenting a user_name/password combination which may or may not include any suitable two-factor authentication. In another embodiment, a cryptocurrency may be used in place of conventional security information, such as replacing a user_name/password with a public cryptocurrency address. That is in one embodiment, the only security information transmitted by a user to a service provider in order to access an online account may be a public cryptocurrency address.

In one embodiment, a public cryptocurrency address may be used to secure an entire account. For example, in one embodiment a public cryptocurrency address may be required in order for a user to login to an online account. In another embodiment, a public cryptocurrency address may be used to secure part of an online account, such as enabling access to a subset of data associated with the account, or enabling certain features of an online account. For example, a cryptocurrency exchange account may have associated with it a cold storage area (i.e., a vault) for storing information representing cryptocurrency that is stored offline. In one embodiment, access to the cold storage area may be enabled based on a public cryptocurrency address. In another embodiment, a public cryptocurrency address may enable a particular feature of an online account, such as the ability to transfer funds out of an account (cryptocurrency account, bank account, brokerage account, etc.). In yet another embodiment, a public cryptocurrency address may be associated with and enable a single transaction associated with an online account, such as a single transfer of funds out of the account.

Figure 1B:
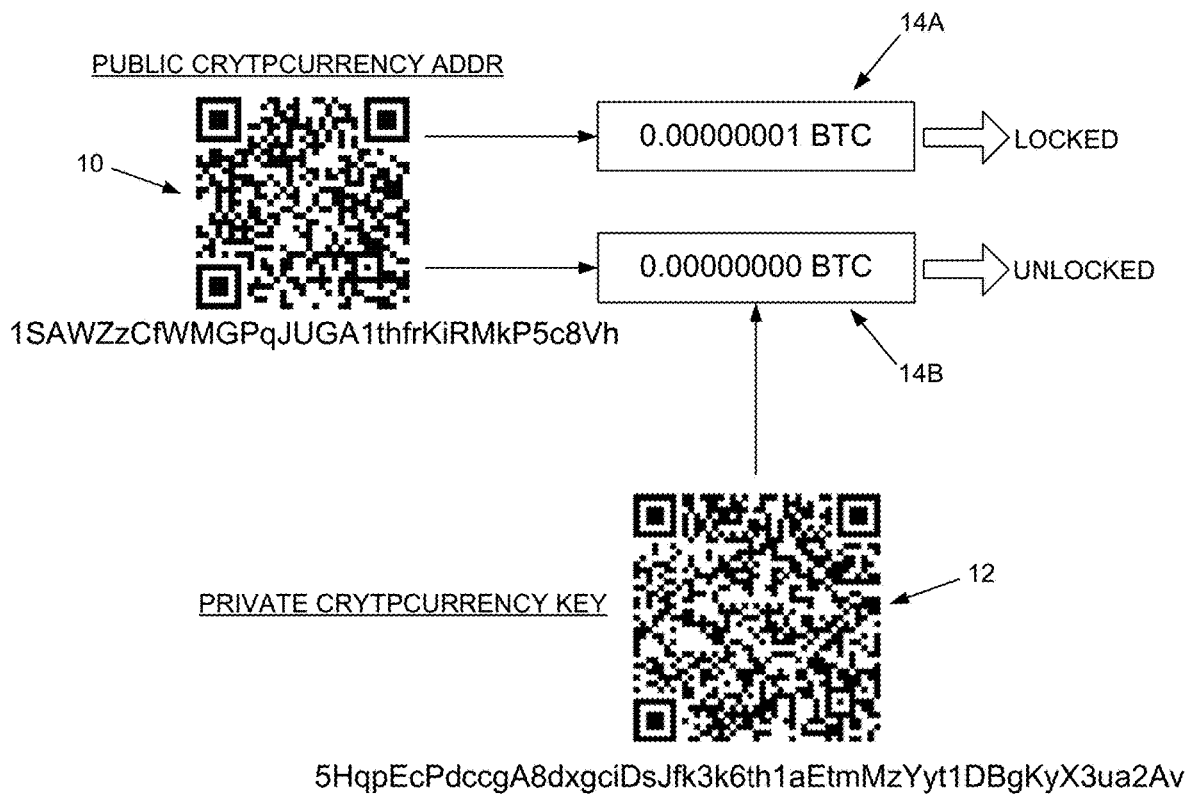
FIG. 1B illustrates an embodiment wherein the cryptocurrency is bitcoin, the balance associated with a public bitcoin address is initialized with one satoshi in order to lock at least part of an online account, and the satoshi is transferred out of the public bitcoin address using a corresponding private bitcoin key in order to unlock at least part of the online account.

FIG. 1B illustrates an embodiment for managing an online account, wherein in this example the balance associated with a public cryptocurrency address is conceptually used to "lock" or "unlock" access and/or functionality of at least part of an online account. In FIG. 1B, a public cryptocurrency address 10 and a corresponding private cryptocurrency key 12 are generated using any suitable technique (the private key and public address shown in FIG. 1B are bitcoin for illustration only). For example with bitcoin, a public bitcoin address and private bitcoin key may be generated using the BitAddress.org website. In one embodiment, the user of an online account generates the public cryptocurrency addresses and private cryptocurrency keys in a manner such that only the user knows, holds, and maintains the private cryptocurrency key. In one embodiment, the balance 14A associated with the public cryptocurrency address 10 may be initialized to a non-zero value. For example, in one embodiment a small unit of currency (e.g., a satoshi in bitcoin) may be transferred to the balance of the public cryptocurrency address. In one embodiment, the user of an online account may initialize the balance of the public cryptocurrency address, and in another embodiment, a service provider may initialize the balance after the user transmits the public cryptocurrency address to the service provider.

In the example of FIG. 1B, the balance 14A of the public cryptocurrency address 10 is initialized to one satoshi or 0.00000001 of a bitcoin. Once the balance has been initialized to a non-zero value, the only way the balance may be reduced (via an outgoing transfer) is with the private cryptocurrency key 12 which is known, in one embodiment, only by the user of the online account. Accordingly, as long as the balance of the public cryptocurrency address is not reduced, the service provider will deny access and/or features of at least part of the online account. When the user desires access to the secure part of the account, in one embodiment the user employs the private cryptocurrency key 12 to reduce the balance associated with the public cryptocurrency address 10. In the example shown in FIG. 1B, the single satoshi may be transferred out of the public cryptocurrency address 10 such that the balance 14B is reduced to zero, thereby placing the balance of the public cryptocurrency address in an "unlocked" state. When the service provider for the online account checks the balance for the public cryptocurrency address 10 and sees that the balance has been reduced, the service provider enables access to the secure part of the online account. In this manner, the private cryptocurrency key 12 becomes a key used to access at least part of an online account, wherein in one embodiment the private cryptocurrency key 12 may be known only to a single entity (e.g., the user), thereby avoiding the need to store this private security information at the service provider.

Figure 2A:
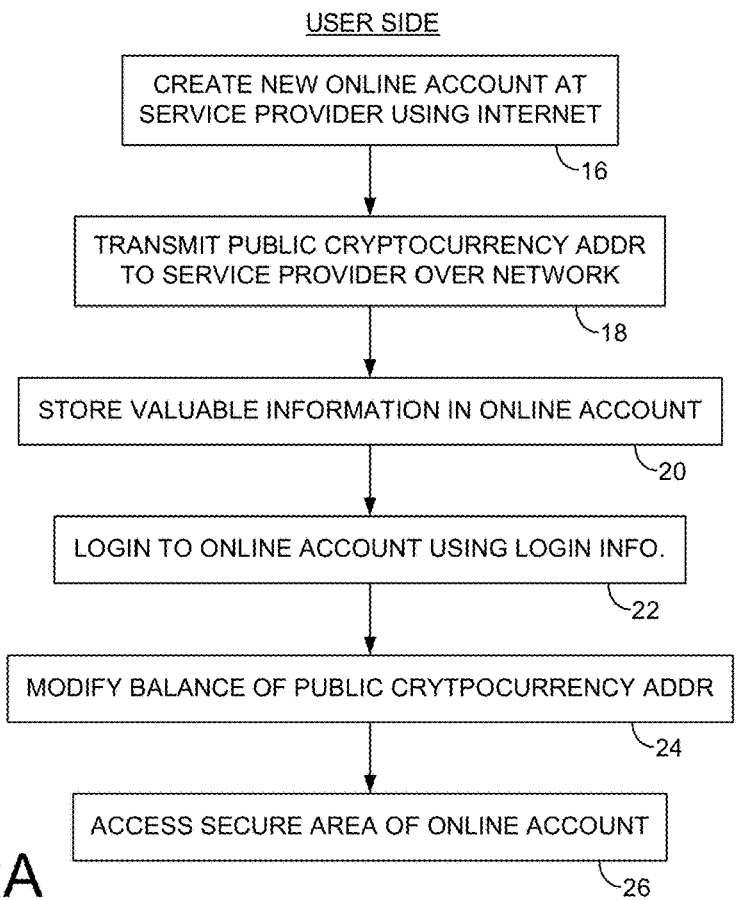
FIG. 2A is a flow diagram according to an embodiment executed at a user side of a computer network for creating a new online account and for transmitting a public cryptocurrency address to a service provider computer that manages the online account.

FIG. 2A is a flow diagram according to an embodiment executed at the user side of a computer network for managing an online account. In this embodiment, the user creates a new online account over the Internet (block 16), for example, by visiting a website or executing a smartphone app of any suitable service provider (bank, brokerage, exchange, utility, hospital, military, etc.). In one embodiment, the user may transmit security information for accessing the online account, such as a user_name/password. In another embodiment described below, the account security information transmitted to the service provider may consist of only a public cryptocurrency address, that is, an online account may be associated with a public cryptocurrency address rather than with a specific user. At some point, the user transmits a public cryptocurrency address to the service provider (block 18) over a network such as the Internet, or in another embodiment, using a text messaging feature of a cellular network.

Valuable information is stored (or associated with) the online account (block 20), such as the user transferring funds or other valuable information to the account. When the user desires to access the account, the user logs into the account (block 22), wherein in one embodiment, logging into an account may include setting up a secure communication link between the user and the service provider. In one embodiment, logging into the online account may include entering a user_name/password and may also include a suitable two-factor authentication. Once the user has logged into the online account, a certain subset of data and/or a certain subset of features may be disabled due to the public cryptocurrency address reflecting a particular balance (e.g., a non-zero balance). When the user desires to enable access to the secure part of the online account, the user employs the private cryptocurrency key in order to modify (e.g. reduce) the balance associated with the public cryptocurrency address (block 24). For example, the user may transfer all or part of the balance from the account public address to a different public address, thereby reducing the balance of the account public address. Once the balance of the account public address has been modified, the user is allowed to access the secure area (or secure feature) of the online account (block 26).

In one embodiment, the secure communication link during the login sessions helps maintain security of the online account while the secure area or feature of the online account is unlocked and accessed by the user. In an embodiment described below, a new public cryptocurrency address may be used to re-secure at least part of an online account, for example, after a user finishes accessing the secure area (e.g., when logged off of the account).

Figure 2B:
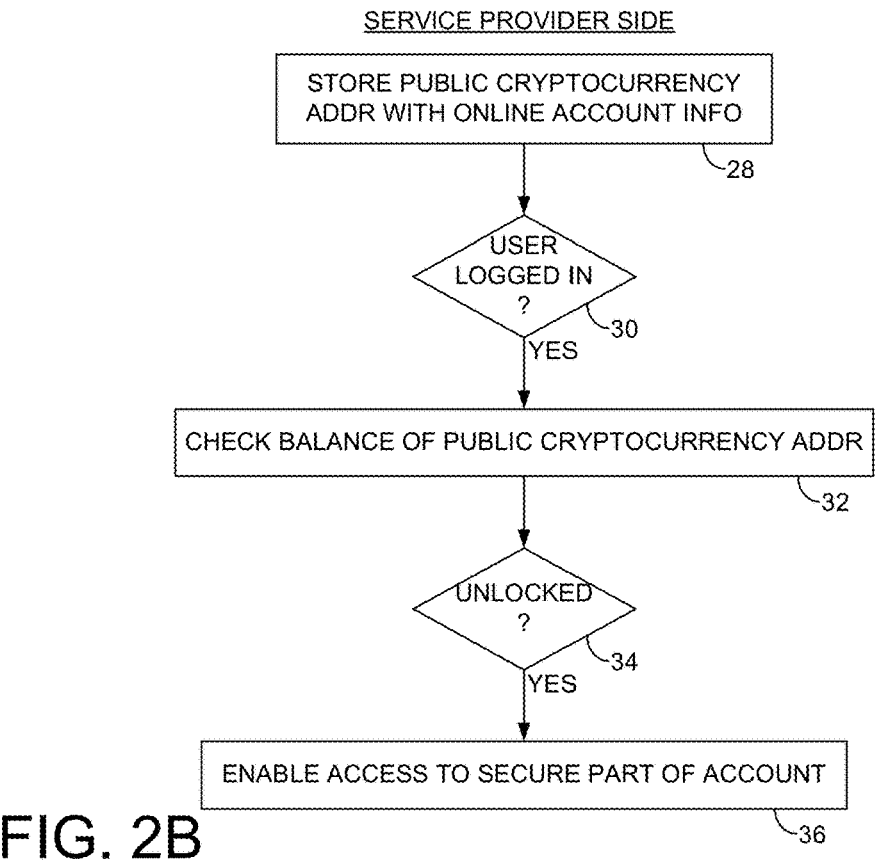
FIG. 2B is a flow diagram according to an embodiment executed at a service provider side of a computer network for checking the balance associated with the user public cryptocurrency address in order to determine whether the user has unlocked at least part of the online account.

FIG. 2B is a flow diagram according to an embodiment executed at a service provider side of a computer network responsible for maintaining online accounts for users. In one embodiment, the service provider stores the public cryptocurrency address received from the user together with other login information of the user (e.g., user_name/password) and associates the information with the online account (block 28). In another embodiment described below, the service provider may store and associate only the public cryptocurrency address received from the user with the online account. After the user logs into the online account at block 30 (or as part of the login process), the service provider checks the balance associated with the public cryptocurrency address assigned to the account (block 32). If the checked balance indicates the user has unlocked the secure area of the account using the corresponding private cryptocurrency key (block 34), the service provider enables access to the secure area of the account (block 36).

In one embodiment, once the balance of a public cryptocurrency address has been modified using the private cryptocurrency key in order to unlock a secure area of an online account, the private cryptocurrency key may be considered as unsecure since it was transmitted over the Internet in order to execute the balance transfer. Accordingly, in one embodiment each time a user accesses a secure area (or feature) of an account, the user transmits a new public cryptocurrency address to the service provider in order to re-secure the secure area of the account.

Figure 3A:
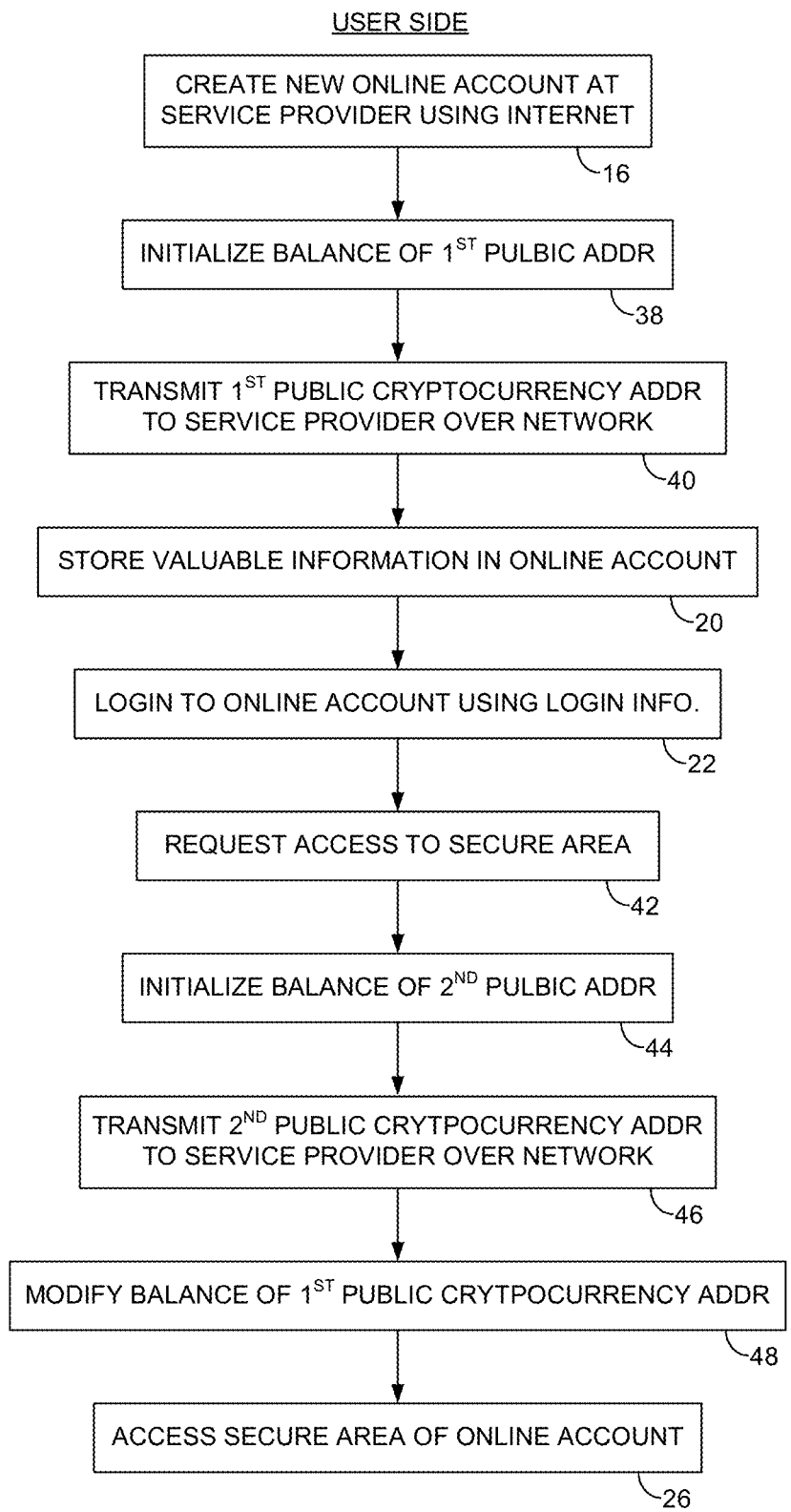
FIG. 3A is a flow diagram according to an embodiment executed at a user side of a computer network wherein after unlocking part of an online account using a first public cryptocurrency address, the user transmits a second public cryptocurrency address to the service provider in order to re-secure the account.

This embodiment is understood with reference to the flow diagram of FIG. 3A which is executed at the user side of a network computers for managing an online account. After creating a new online account (block 16), the user initializes the balance of a first public cryptocurrency address, for example, by transferring a small amount of cryptocurrency to the first public cryptocurrency address (block 38) as illustrated in FIG. 1B. The user transmits the first public cryptocurrency address to the service provider over a network of computers (block 38), wherein the network of computers may comprise the Internet and/or a cellular network.

When the user logs into the account, the user transmits a request to the service provider to access the secure area of the online account (block 42). In addition, the user initializes a balance of a second public cryptocurrency address (block 44) and transmits the second public cryptocurrency address to the service provider (block 46), for example, in connection with the request to access the secure area of the account. The user modifies the balance of the first public cryptocurrency address using the corresponding private cryptocurrency key (block 48) in order to unlock the secure area of the online account. As described below, in one embodiment the service provider uses the second public cryptocurrency address to re-secure (re-lock) the secure area of the online account once the user is finished accessing the secure area (e.g., when the user finishes a transaction or when the user is logged off).

Figure 3B:
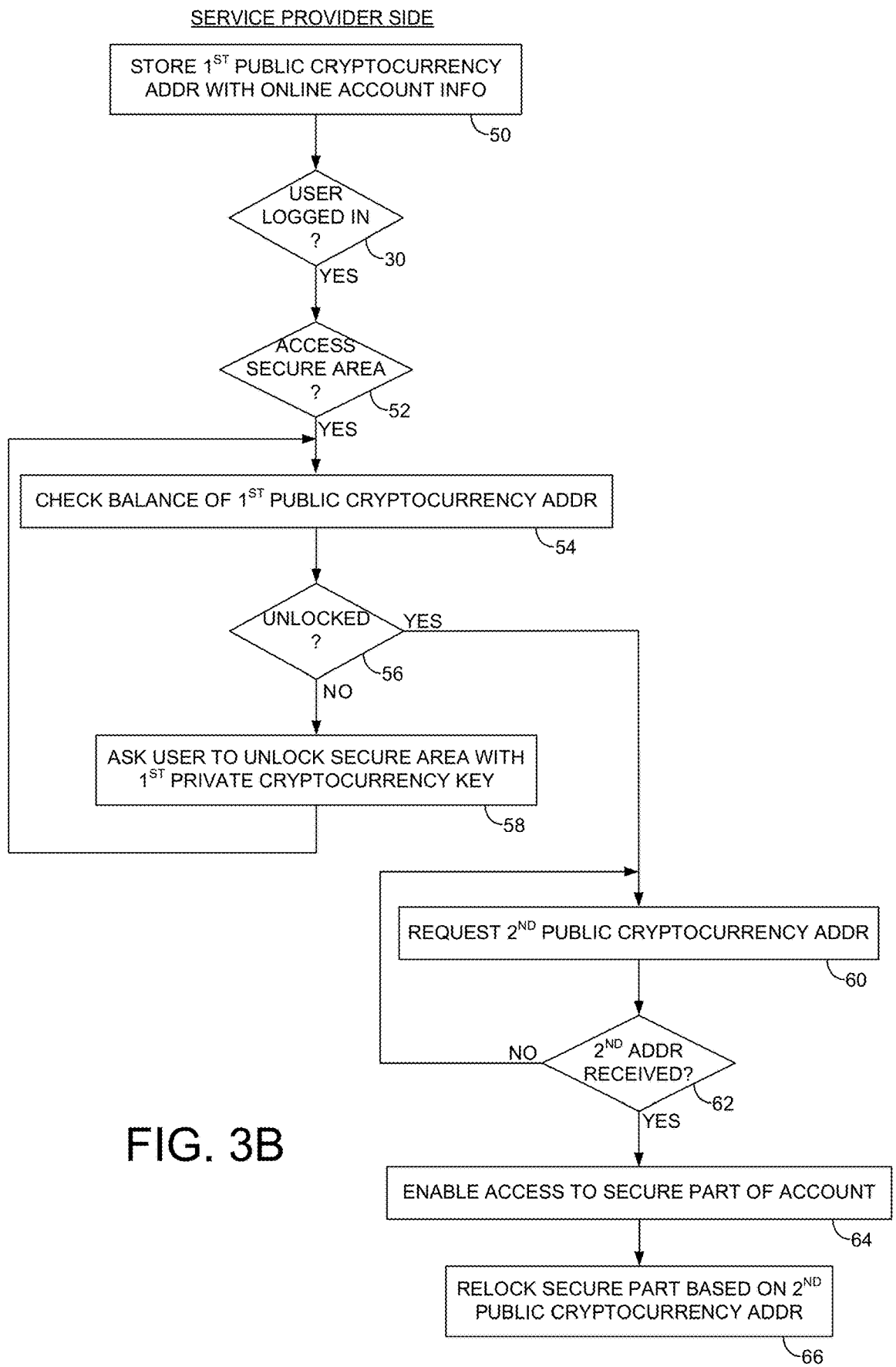
FIG. 3B is a flow diagram according to an embodiment executed at a service provider side of a computer network wherein the service provider waits for the second public cryptocurrency address to be transmitted by the user before enabling access to a secure area of an account.

FIG. 3B is a flow diagram according to an embodiment executed at the service provider side of a computer network responsible for maintaining online accounts for users. The first public cryptocurrency address received from a user is stored and associated with the user's online account (block 50). After (or when) a user logs into an account, the user transmits a request to access the secure area of the account (block 52). In response to the request, the service provider checks the balance associated with the first public cryptocurrency address (block 54). If the checked balance indicates the secure area of the account is locked (block 56), the service provider transmits a request to the user to unlock the secure area using the first private cryptocurrency key corresponding to the first public cryptocurrency address (block 58). The flow diagram is then re-executed from block 54 until the balance associated with the first public cryptocurrency address indicates the secure area has been unlocked. If a second public cryptocurrency address has not yet been received from the user, the service provider sends a request to the user to transmit a second public cryptocurrency address (block 60), and in the embodiment of FIG. 3B, the service provider may keep the secure area of the account locked (block 62) until the user transmits the second public cryptocurrency address. After receiving the second public cryptocurrency address from the user, the service provider enables access to the secure area of the account (block 64). When access to the secure area of the account is completed, the service provider re-secures (re-locks) the secure area of the account using the second public cryptocurrency address (block 66).

Any suitable technique may be employed by the service provider to check the balance associated with a public cryptocurrency address, and thereby determine whether a secure area of an online account is locked. In one embodiment, the service provider may query the blockchain database of the cryptocurrency directly by employing any suitable, well known techniques. In another embodiment, the service provider may utilize an application of a third party provider, such as with the smartphone app "Bitcoin Balance" or other similar app. With Bitcoin Balance, for example, the service provider may provide as input the address of the public cryptocurrency address, wherein the app then returns the balance associated with the public cryptocurrency address.

In the flow diagram of FIG. 3A, the user may initialize the balance of the public cryptocurrency address in order to configure it into the locked state (e.g., by transferring a small amount to the public cryptocurrency address as shown in FIG. 1B). In another embodiment, the service provider may initialize the public cryptocurrency address in order to configure it into the locked state. For example, the user may generate a public cryptocurrency address which typically has a default zero balance, and then transmit the zero-balance address to the service provider. The service provider may then initialize the balance of the public cryptocurrency address to any suitable value that may represents any suitable characteristic. For example, the service provider may initialize the balance of a public cryptocurrency address to particular values that may reflect different states, or different types of accounts, or different parts of the online account to secure, or any other information that may be useful to the service provider in maintaining the online account.

Figure 4:
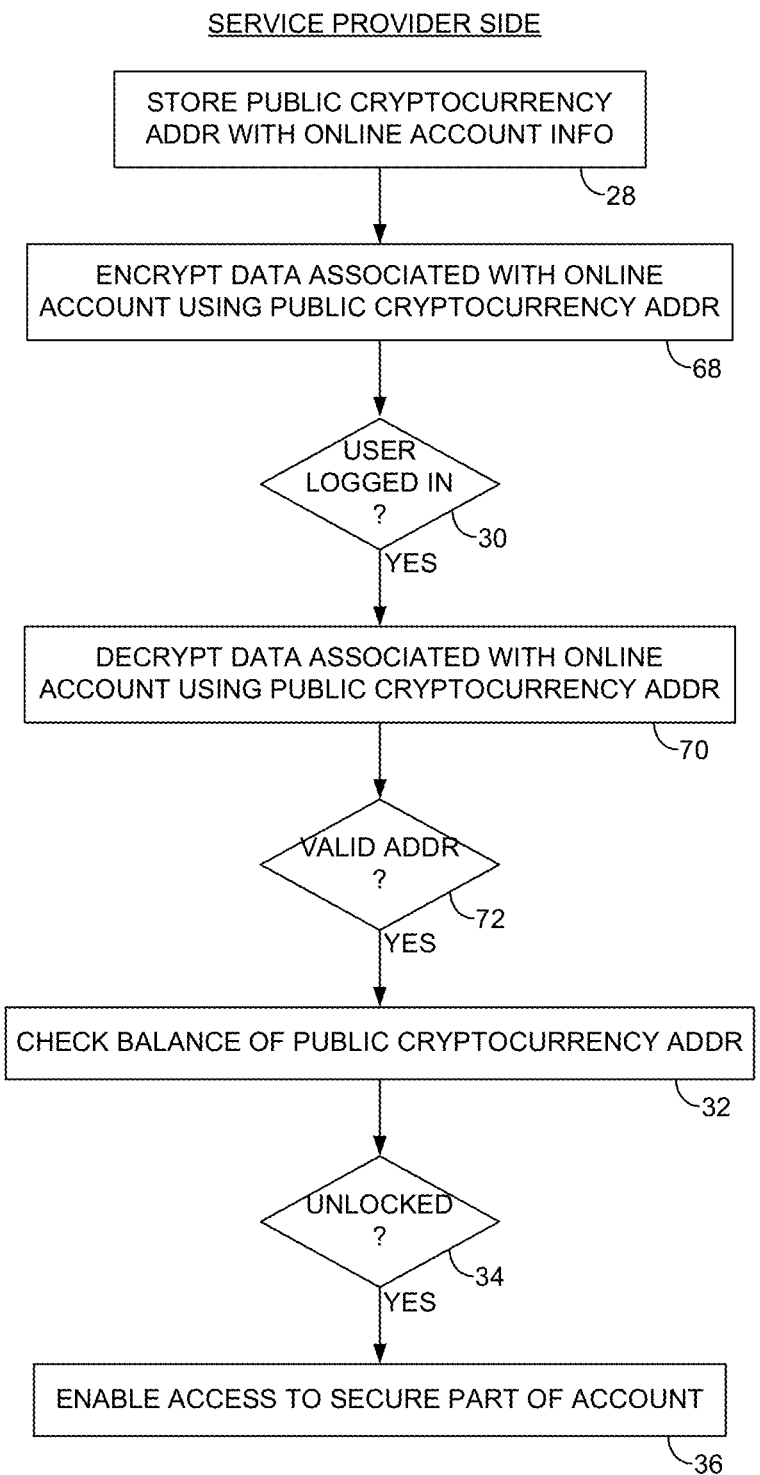
FIG. 4 is a flow diagram according to an embodiment executed at a service provider side of a computer network wherein the public cryptocurrency address received from the user is used to encrypt at least part of the data associated with the online account in order to authenticate the public cryptocurrency address at a later time.

In one embodiment, the service provider may use the public cryptocurrency address associated with an account to verify that the public cryptocurrency address has not been hacked, thereby preventing the secure area of the account from being unlocked based on an invalid public cryptocurrency address. This embodiment is understood with reference to the flow diagram of FIG. 4 which is an extension of the flow diagram of FIG. 2B. When the service provider receives a valid public cryptocurrency address from a user (e.g., over a secure communication link), the service provider may encrypt at least some of the data associated with the online account using the public cryptocurrency address (block 68). When the user logs into the account at a later time (block 30), the service provider uses the public cryptocurrency address that is associated with the account to decrypt the data encrypted at block 68 (block 70). If the data fails to decrypt correctly, it indicates that the public cryptocurrency address was changed (hacked), and therefore the address is considered invalid (block 72). If the data decrypts correctly, it means the public cryptocurrency address associated with the account is valid, and therefore access to the secure area of the account is enabled as long as the checked balance of the public cryptocurrency address indicates the secure area has been unlocked by the user.

Figure 5:
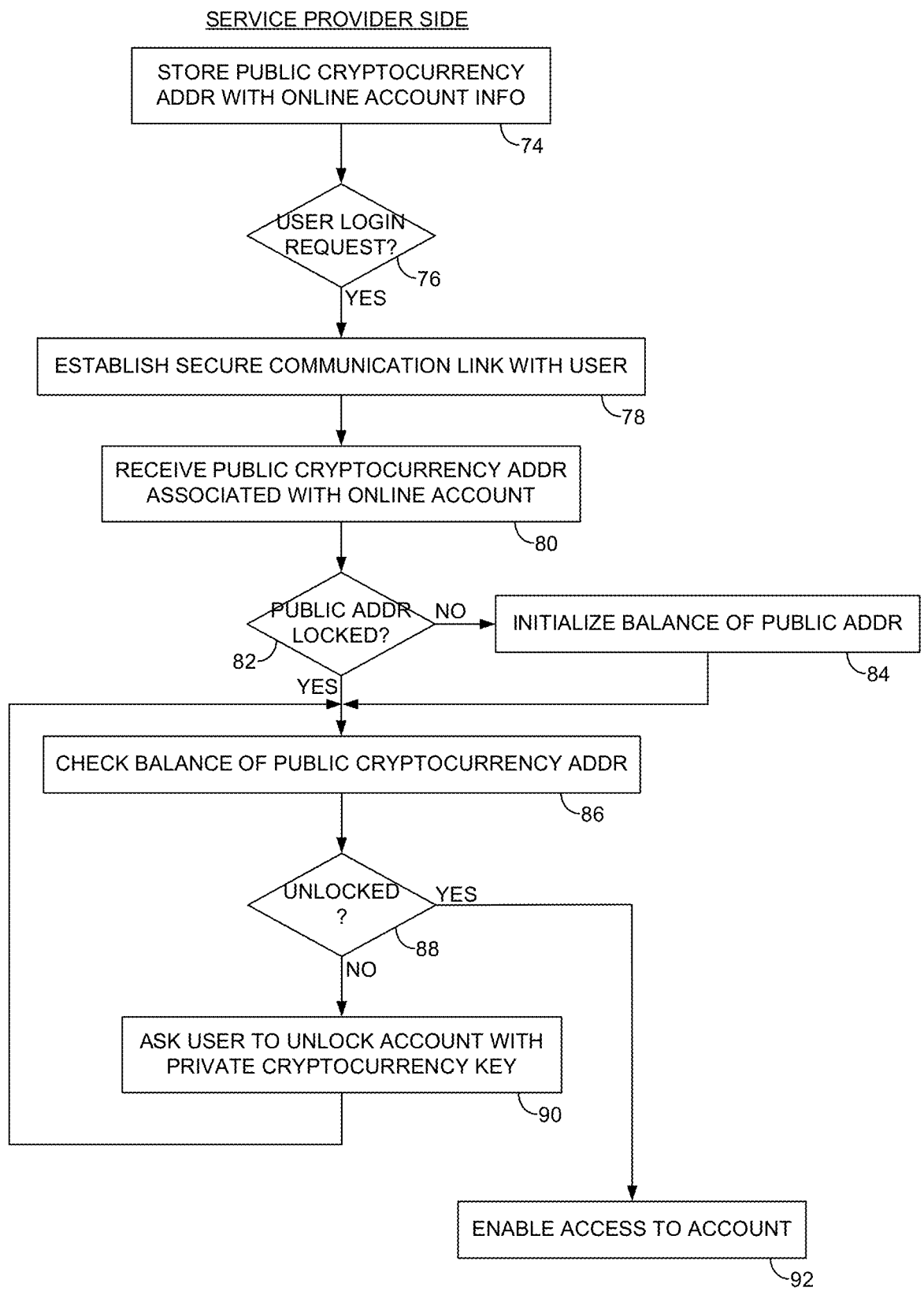
FIG. 5 is a flow diagram according to an embodiment executed at a service provider side of a computer network wherein a user's login information may consist of only a public cryptocurrency address.

FIG. 5 is a flow diagram according to an embodiment wherein the user login information may consist only of a public cryptocurrency address generated by the user. For example, when a user visits a "new user account" page of a website or app, the service provider may request only a public cryptocurrency address in order to open a new account. The public cryptocurrency address received by the service provider from the user is then associated with the online account (block 74), and optionally used to encrypt at least part of the data associated with the account as described above. When the user wants to log into the account (block 76), the user may visit a "login" page of a website or app in order to establish a secure communication link with the service provider (block 78). The user then transmits the public cryptocurrency address associated with the account to the service provider, and when the service provider receives the public cryptocurrency address (block 80), the service provider checks the balance of the public cryptocurrency address to verify whether it is locked (block 82). If the balance of the public cryptocurrency address is in the unlocked state, then the service provider initialize the balance of the public cryptocurrency address to the locked state (block 84), for example, by transferring a small amount of cryptocurrency to the public cryptocurrency address. The service provider checks the balance of the public cryptocurrency address (block 86), and if the balance is in the locked state (block 88), the service provider requests the user to unlock the secure area by modifying the balance using the private cryptocurrency key (block 90). Once the user modifies the balance of the public cryptocurrency address to reflect the unlocked state, the service provider enables access to the secure area of the online account (block 92).

Figure 6:
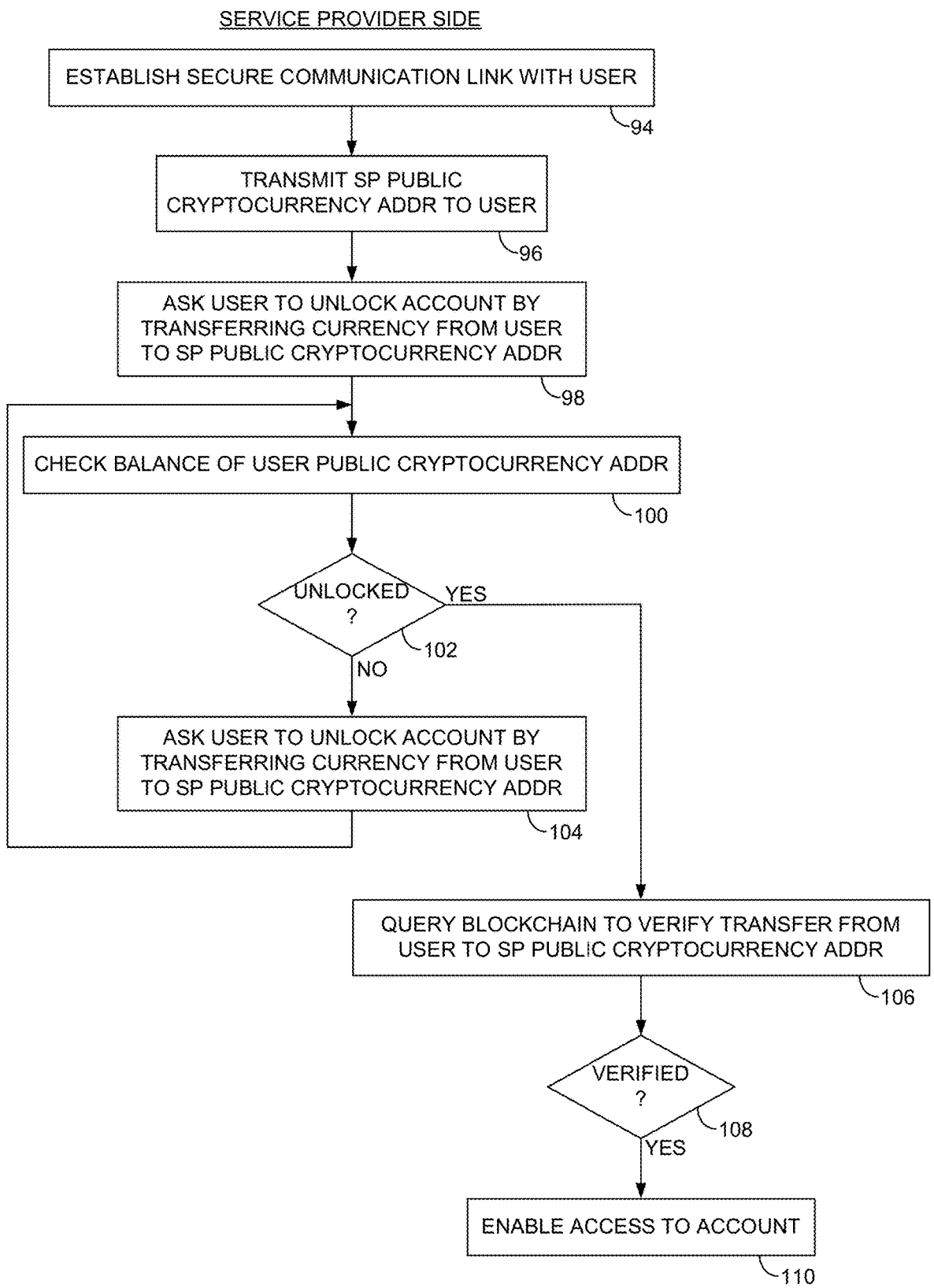
FIG. 6 is a flow diagram according to an embodiment executed at a service provider side of a computer network wherein a user unlocks a secure area of an online account by transferring cryptocurrency from the user public cryptocurrency address to a service provider (SP) public cryptocurrency address, and the transfer is verified by the service provider in order to enhance the security of the online account.

FIG. 6 is a flow diagram according to an embodiment executed at the service provider side of a computer network responsible for maintaining online accounts for users. This embodiment may be used to increase the security of the online account by requiring the user to modify the balance of a user's public cryptocurrency address associated with the account (and thereby unlock the account) by transferring currency from the user public cryptocurrency address to a public cryptocurrency address provided by the service provider. After establishing a secure communication link with the user (block 94), the service provider transmits a service provider (SP) public cryptocurrency address to the user (block 96) and asks the user to unlock the account by transferring currency from the user public cryptocurrency address to the SP public cryptocurrency address (block 98).

In one embodiment, only the service provider and the user are aware of the SP public cryptocurrency address since it is transmitted to the user over the secure communication link (e.g., secure Internet link, secure cellular network link, etc.). The service provider checks the balance of the user public cryptocurrency address (block 100) and continues waiting for the user to execute the transfer (block 104) until the balance of the user public cryptocurrency address indicates it has been modified to the unlocked state (block 102). The service provider queries the blockchain database associated with the cryptocurrency in order to verify there was in fact a transfer from the user public cryptocurrency address to the SP public cryptocurrency address (block 106). If the blockchain verifies the transfer (block 108), the service provider enables access to a secure part (or feature) of the online account at block 110 (which may be the entire account).

Figure 7A:
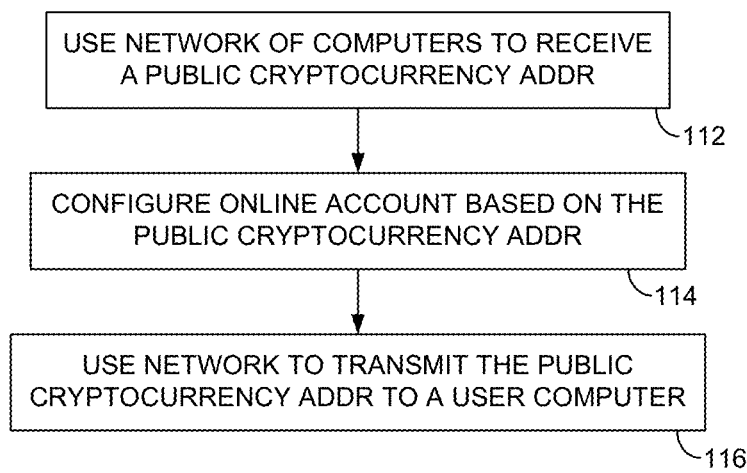
FIG. 7A is a flow diagram according to an embodiment executed at a service provider side of a computer network wherein after receiving a public cryptocurrency address using the computer network and configuring an online account of a user based on the public cryptocurrency address, the public cryptocurrency address is transmitted using the computer network to a user computer.

FIG. 7A is a flow diagram according to an embodiment executed at the service provider side of a computer network responsible for maintaining online accounts for users. A network of computers (e.g., Internet and/or cellular network) is used to receive a public cryptocurrency address (block 112), for example, from a user computer. An online account associated with a user is then configured based on the public cryptocurrency address (block 114), for example, by locking at least part of the online account as described above. The network of computers is used to transmit the public cryptocurrency address to a user computer (block 116), and in one embodiment, instructions (e.g., code, script, etc.) is also transmitted to the user computer for displaying the public cryptocurrency address on a screen of the user computer.

Figure 7B:
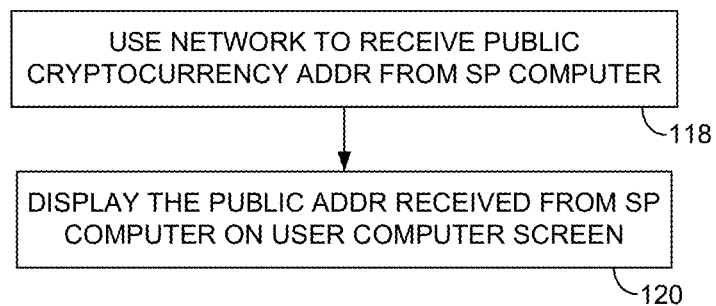
FIG. 7B is a flow diagram according to an embodiment executed at a user side of a computer network wherein the public cryptocurrency address received from the service provider is displayed on a screen of the user computer.

FIG. 7B is a flow diagram according to an embodiment executed at the user side of a computer network responsible for maintaining online accounts for users. The network of computers is used to receive the public cryptocurrency address from the service provider (block 118). The public cryptocurrency address is displayed on a screen of the user computer (block 120), for example, by executing a suitable browser or smartphone app for interfacing with a service provider computer using the computer network. In one embodiment, the public cryptocurrency address may be displayed on the screen of the user computer during a first login session when the user computer transmits the public cryptocurrency address to the service provider in order to configure the online account. In another embodiment, the public cryptocurrency address may be displayed on the screen of the user computer during subsequent login sessions. In either embodiment, displaying the public cryptocurrency address allows the user to verify that the address is correct. For example, the user may have a paper wallet and/or a digital wallet (e.g., Mycelium) that may display the public cryptocurrency address associated with the online account for comparison to the public cryptocurrency address received from the service provider.

In one embodiment, the user may verify that the secure area of an online account is currently in the locked state by evaluating the balance associated with the public cryptocurrency address. For example, the user may use a digital wallet (e.g., Mycelium) or other suitable application (e.g., Bitcoin Balance) to display the current balance associated with the public cryptocurrency address. In one embodiment, if the current balance of the public cryptocurrency address is an expected value (e.g., any non-zero value), it may confirm to the user that the secure area of the online account is locked, and if the balance has been reduced (e.g., to zero), it alerts the user that the online account is no longer in the locked state. In one embodiment, the user computer may execute a computer program that automatically performs the periodic check of the balance of the public cryptocurrency address to verify the state of the online account. If the state changes, the computer program may alert the user in any suitable manner, such as by displaying an alert dialog box, sending an alert email, sending an alert text message, etc. In one embodiment, the computer program may be implemented as a separate application, and in another embodiment the computer program may be integrated into a suitable wallet application (e.g., Mycelium). In yet another embodiment, the user and/or user computer executing a computer program may query the blockchain database (e.g., using Bitcoin Balance, Mycelium, etc. or directly) to periodically check the balance by evaluating the transaction history of the public cryptocurrency address to verify there are no outgoing transactions that would reduce the balance without evaluating the actual balance. In still another embodiment, the user and/or user computer executing a computer program may query the blockchain database to periodically verify there is only one transaction associated with the public cryptocurrency address (the first transfer-in to initialize the balance). This embodiment may alert the user and/or user computer to suspicious activity if there is a transfer-out of the balance, or even if there is a second transfer-in to the balance of the public cryptocurrency address. Accordingly, these embodiments may enable a user to periodically check the locked status of an online account without having to log into the online account which can be time consuming and potentially dangerous from a security standpoint.

Figure 8A:
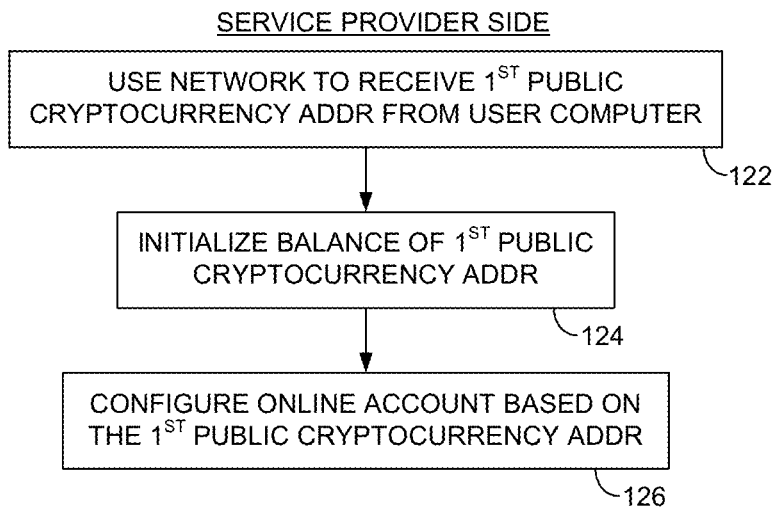
FIG. 8A is a flow diagram according to an embodiment executed at a service provider side of a computer network wherein a balance associated with a first public cryptocurrency address received from a user is initialized by transferring an initial amount from a second public cryptocurrency address.

FIG. 8A is a flow diagram according to an embodiment executed at the service provider side of a computer network responsible for maintaining online accounts for users. As described above, in one embodiment the service provider may initialize the balance of a public cryptocurrency address received from a user to any suitable initial amount. Accordingly, using a network of computers (e.g., Internet, cellular, etc.), the service provider may receive a first public cryptocurrency address from a user computer (block 122). The service provider may initialize the balance of the first public cryptocurrency address to any suitable initial amount (block 124), and configure an online account for the user (e.g., lock part of the account) based on the first public cryptocurrency address (block 126). For example, a user may have the ability to generate a public cryptocurrency address and a corresponding private cryptocurrency key for free using any suitable website or application (e.g., using BitAddress.org for bitcoin or any suitable wallet application); however, the user may not have the ability to initialize the balance associated with the public cryptocurrency address (i.e., the user may not have access to or want access to any cryptocurrency). Accordingly, the user may generate a public cryptocurrency address having a zero balance, and then transmit the zero balance public cryptocurrency address over the network to the service provider. In one embodiment, the service provider computer has access to cryptocurrency, and can therefore initialize the balance of the public cryptocurrency address for the user as described above.

Figure 8B:
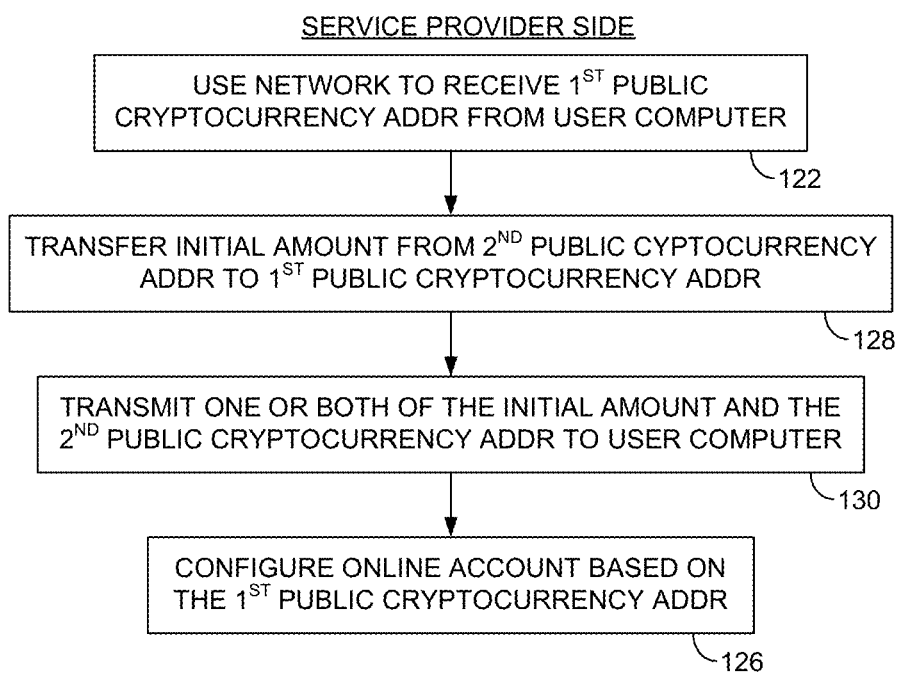
FIG. 8B is a flow diagram according to an embodiment executed at a service provider side of a computer network wherein one or both of the initial amount and the second public cryptocurrency address are transmitted over a computer network to a user computer.

FIG. 8B is a flow diagram according to an embodiment executed at the service provider side of a computer network responsible for maintaining online accounts for users. FIG. 8B extends on the flow diagram of FIG. 8A, wherein in one embodiment the service provider may initialize the balance of the first public cryptocurrency address by transferring an initial amount of cryptocurrency from a balance associated with a second public cryptocurrency address to the balance associated with the first public cryptocurrency address (block 128). The service provider then transmits to the user computer (over a computer network such as the Internet or cellular network) one or both of the initial amount and the second public cryptocurrency address used to initialize the first public cryptocurrency address received from the user (block 130).

Figure 8C:
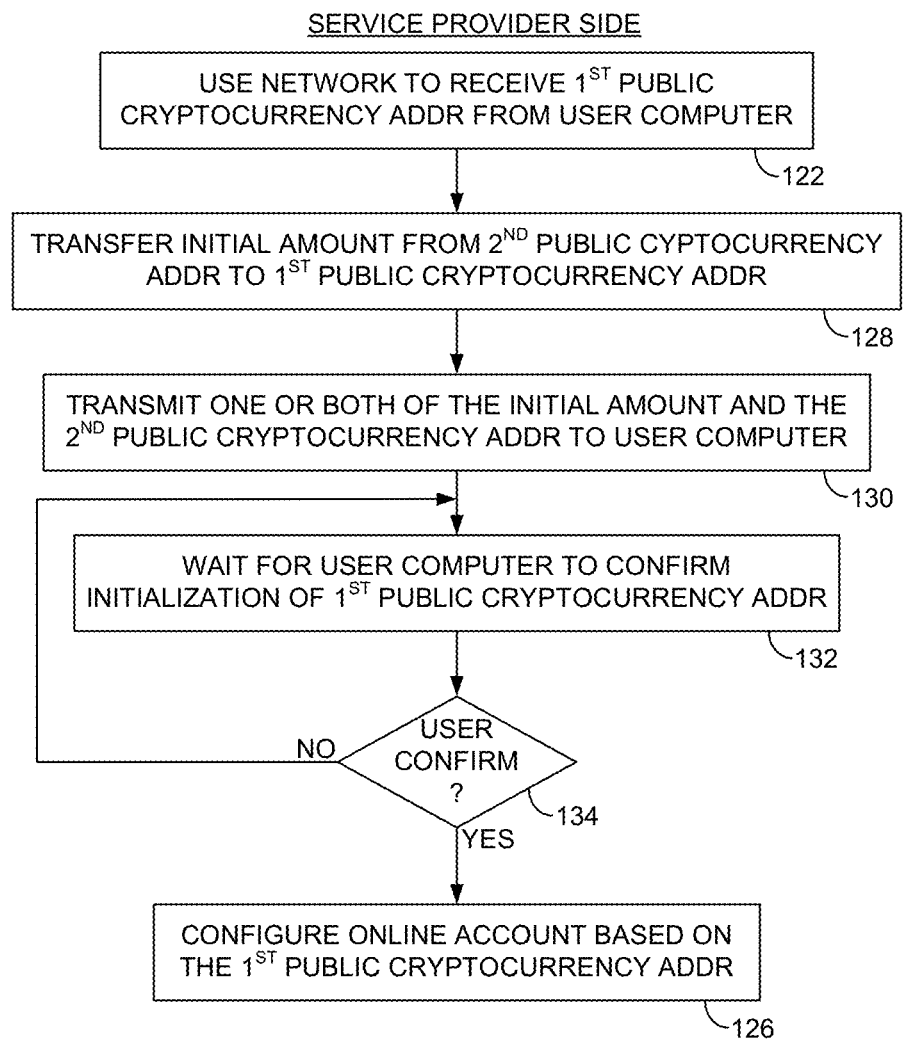
FIG. 8C is a flow diagram according to an embodiment executed at a service provider side of a computer network wherein the service provider delays configuring the online account until receiving a confirmation from the user that the first public cryptocurrency address was initialized correctly.

FIG. 8C is a flow diagram according to an embodiment executed at the service provider side of a computer network responsible for maintaining online accounts for users. FIG. 8C extends on the flow diagram of FIG. 8B, wherein after transmitting to the user one or both of the initial amount and the second public cryptocurrency address used to initialize the first public cryptocurrency address received from the user (block 130), the service provider waits to receive over the computer network a confirmation from the user computer that the initialization of the first public cryptocurrency address was initialized correctly (block 132). For example, in one embodiment the service provider may transmit to the user computer suitable code, script, etc. for displaying on the screen of the user computer a dialog box having the initial amount and the second public cryptocurrency address, together with a confirmation button that when selected by the user sends the confirmation over a computer network to the service provider computer that the first public cryptocurrency address was initialized correctly. In another embodiment, the service provider may send an email to the user computer, wherein the email may comprise the initial amount and the second public cryptocurrency address together with a confirmation link for the user to select in order to transmit the confirmation. In yet another embodiment, the user computer may execute a computer program that automatically evaluates the initial amount and/or the second public cryptocurrency address received from the service provider against the blockchain database to verify the transfer, and when verified, automatically transmits the confirmation to the service provider. After the service provider receives the confirmation from the user computer (block 134), the service provider configures the user's online account (block 126).

In one embodiment, the user or the user computer may verify that the balance of the first public cryptocurrency address has been initialized correctly to the initial amount and/or verify that the first public cryptocurrency address was initialized using the service provider's second public cryptocurrency address by executing a query of the blockchain database (either directly or through a third party provider). For example, the user or user computer may use the "Bitcoin Balance" smartphone app to evaluate the balance of a public bitcoin address as described above. Another well-known website used to evaluate the transactions associated with a given public bitcoin address is the website "blockchain.info" which may also be accessed using the "Bitcoin Balance" smartphone application (via the "Source" command of Bitcoin Balance). Whether accessed as a website or through a smartphone app such as Bitcoin Balance, the transactions associated with a given public bitcoin address may be evaluated using the following url:

https://blockchain.info/address/[public bitcoin address]

where the input variable [public bitcoin address] represents the public bitcoin address being evaluated.

FIG. 9A illustrates an example wherein the first public bitcoin address transmitted by the user computer to the service provider computer over the computer network is:

1AiAo5T4N7oqwa7cYWcdPGY6rh6RNHUmMs

After the service provider side initializes the first public bitcoin address with an initial amount of ten cents, the user computer follows the url:

https://blockchain.info/address/
1AiAo5T4N7oqwa7cYWcdPGY6rh6RNHUmMs to return the address's transaction information such as shown in FIG. 9A which may be displayed on a screen of the user computer or otherwise processed by the user computer. In one embodiment, there will be a transaction which is the transfer of the initial amount from the second public bitcoin address of the service provider to the first public bitcoin address of the user. In the example of FIG. 9A, the second public bitcoin address of the service provider is:

13k2DrGcNDmzkf4NyXKwnXnCZSQTKNzyd2

Accordingly, in one embodiment the user or user computer may verify the initialization of the first public bitcoin address by verifying that it contains the correct initial amount (ten cents in the example). In another embodiment, the user or user computer may verify the initialization of the first public bitcoin address by verifying that a transfer occurred from the second public bitcoin address into the balance of the first public bitcoin address such as shown in FIG. 9A. In another embodiment, the user or user computer may verify the initialization of the first public bitcoin address by verifying both the initial amount is correct and that the transfer occurred from the second public bitcoin address. When the user or user computer verifies the initialization, in one embodiment the user computer transmits using the computer network a confirmation to the service provider computer as described above with reference to FIG. 8C.

In the example of FIG. 9A, the initial state of the transfer-in transaction is "Unconfirmed" meaning that an insufficient number of blocks have yet to be published to the bitcoin blockchain. In one embodiment, the Unconfirmed/Confirmed status of a public cryptocurrency address helps prevent a "double spending" of cryptocurrency which is not necessarily a concern in the embodiments disclosed herein. Accordingly, in one embodiment the user computer may transmit the initialization confirmation to the service provider (block 134 of FIG. 8C) even though the status of the initialization transaction may be unconfirmed. In another embodiment, the user or user computer may wait for at least one or more blockchain confirmations (one or more blocks published to the blockchain) before the initialization confirmation is transmitted to the service provider computer.

Figure 9C:
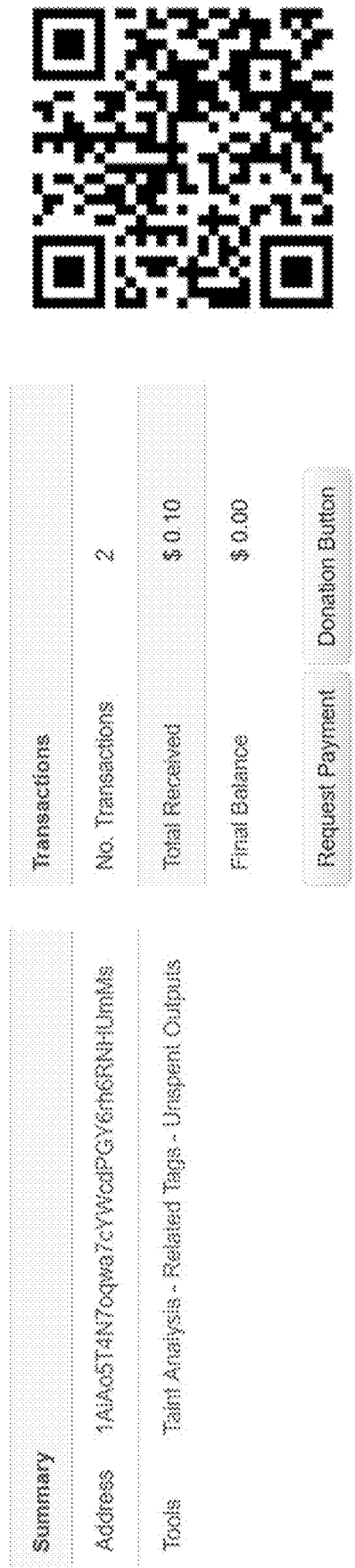
FIG. 9C shows an example wherein when transferring the six cents to the third public cryptocurrency address to unlock an online account, four cents is transferred from the first public cryptocurrency address to a miner as a transaction fee, thereby leaving a zero balance associated with the first public cryptocurrency address.

FIG. 9B shows the transaction history of the first public bitcoin address (provided by blockchain.info) wherein the user (or user computer executing a computer program) unlocks at least part of the user's online account by using the corresponding private bitcoin key to transfer six cents to a third public bitcoin address (with a four cent transaction fee), thereby leaving the final balance of the first public bitcoin address at zero as illustrated in FIG. 9C (also provided by blockchain.info). That is, in the example of FIG. 9B, six cents is transferred to the third public bitcoin address and four cents are paid to the bitcoin miners as a transaction fee. In one embodiment, the larger the transaction fee, the faster the transaction is published to the blockchain. Accordingly, in one embodiment the first public cryptocurrency address may be initialized using a sufficient transaction fee to achieve a desired transaction time for the initialization transaction. In addition, in one embodiment the first public cryptocurrency address may be initialized with a sufficient amount so that the "unlock" transaction (transfer-out) may use a sufficient transaction fee to achieve a desired transaction time.

In the example of FIG. 9B, the third public bitcoin address is:

16wNQo382JePeth4GcysY9cAXBovpppYth

The third public bitcoin address, such as shown in FIG. 9B, may be a user bitcoin address so that the unlock transfer amount (six cents in the example) is transferred to the user. In another embodiment, the third public bitcoin address may be a service provider bitcoin address such that the unlock transfer amount is transferred to the service provider. In either case, the transfer may constitute a return of cryptocurrency to the party that initialized the first public bitcoin address. In the embodiment described above with reference to FIG. 6, the third public bitcoin address may be a service provider (SP) public address transmitted using the computer network to the user computer at block 96. As described above, this embodiment may increase the security of the online account by enabling the service provider computer to verify the transfer (e.g., using blockchain.info) before enabling access to the secure part of the online account.

As described above, in one embodiment the service provider may disable (lock) access to the secure area of an online account until there is an outgoing transfer that would reduce the balance associated with the first public cryptocurrency address. In one embodiment, the service provider may evaluate the actual balance of the first public cryptocurrency address by executing a query of the blockchain database. However, those skilled in the art also understand that checking the balance of the first public cryptocurrency address (e.g., at block 4, block 32, block 54, block 86, block 100) could alternatively mean to query the blockchain database (such as shown in FIG. 9B) to detect whether there was an outgoing transfer that would reduce the balance associated with the first public cryptocurrency address without evaluating the actual balance.

Figure 10A:
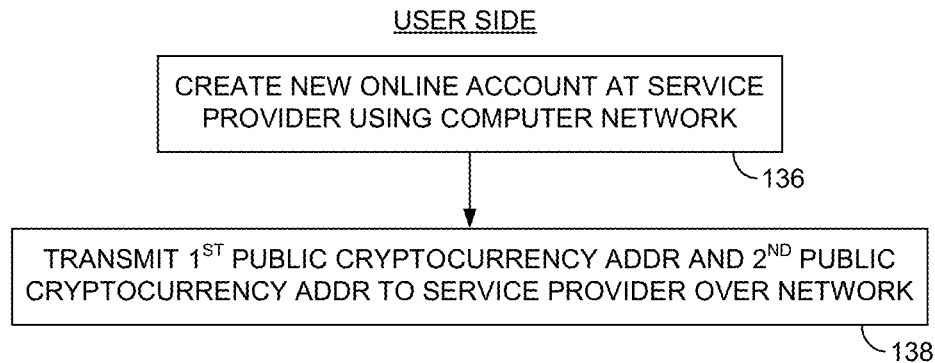
FIG. 10A is a flow diagram according to an embodiment executed at a user side of a computer network for creating a new online account and for transmitting a first and second public cryptocurrency addresses to a service provider computer that manages the online account.

FIG. 10A is a flow diagram according to an embodiment executed at the user side of a computer network for managing an online account. In this embodiment, when creating a new online account using the computer network (block 136), the user transmits using the computer network a first public cryptocurrency address and a second public cryptocurrency address to the service provider (block 138). In one embodiment, the balance associated with the first and second public cryptocurrency addresses may be initialized by the user, and in another embodiment initialized by the service provider as described above. In one embodiment, the service provider configures the online account to enable access to a secure area(s) of the online account based on both the first and second public cryptocurrency addresses (e.g., based on the balance, transaction history, etc.).

In one embodiment, the user may consider the first public cryptocurrency address as a "working address" for accessing a secure area of the online account as part of a normal access operation, and in one embodiment the user may consider the second public cryptocurrency address as a "master address." For example, in one embodiment the first public cryptocurrency address (working address) may be stored in a user's digital wallet for accessing the online account normally, for example, to enable a transfer of funds within or out of the account. In one embodiment, the working address may change over time, such as after each access operation as described above with reference to FIGS. 3A and 3B. In an embodiment where the current working address is stored in a digital wallet, the digital wallet may be lost or stolen (e.g., a smartphone may be lost or stolen). If this happens, in one embodiment the user may employ the second public cryptocurrency address (master address) to unlock a secure area of the account. In one embodiment, the address for the master address may not change over time except when the user employs the master address to unlock a secure area of the online account.

In one embodiment, the private cryptocurrency key corresponding to the second public cryptocurrency address (master address) may be stored in a safe location (e.g., in a paper or digital form) where it would be unlikely to be lost or stolen (e.g., in a home safe or a bank safe deposit box). In one embodiment, when a user employs the second public cryptocurrency address (master address) to unlock a secure area of an online account, the user may reset both the first public cryptocurrency address (working address) and the second public cryptocurrency address (master address) for the online account. In one embodiment, the user may configure multiple online accounts using the same master address so that a single master address may be stored and then employed to unlock and reset the multiple accounts (e.g., when a smartphone is lost or stolen).

Figure 10B:
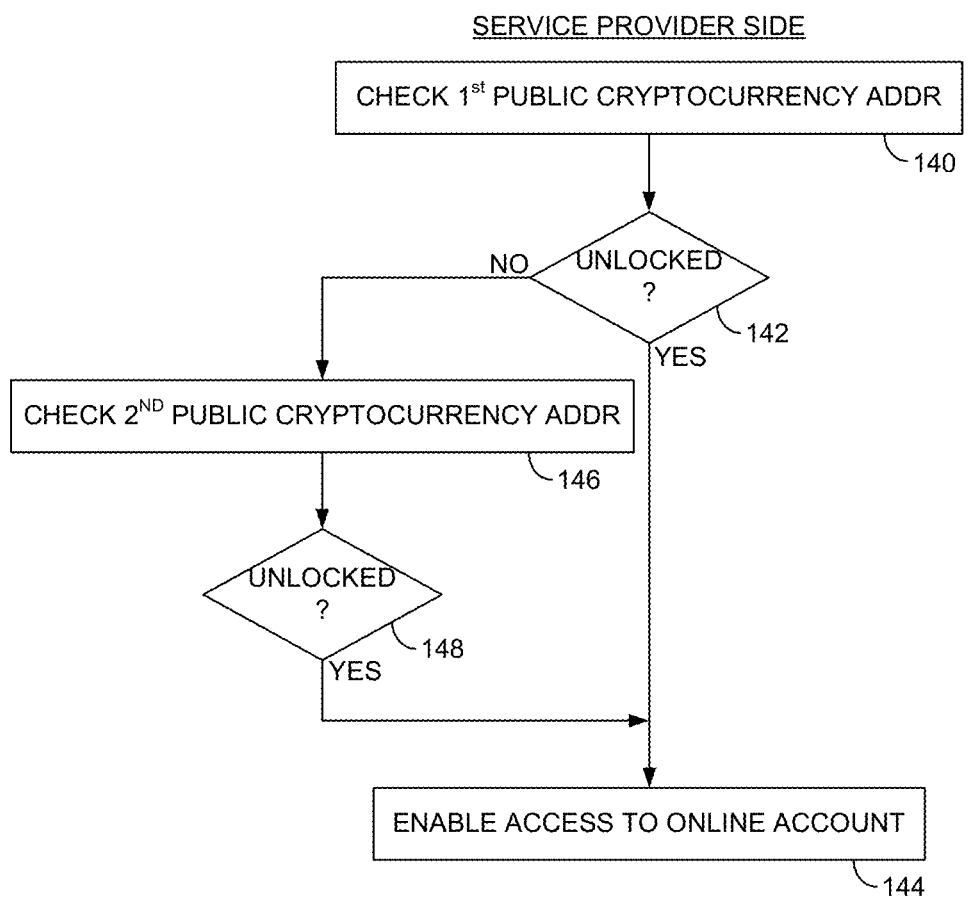
FIG. 10B is a flow diagram according to an embodiment executed at a service provider side of a computer network for checking the first and second public cryptocurrency addresses in order to determine whether the user has unlocked at least part of the online account.

FIG. 10B is a flow diagram according to an embodiment executed at the service provider side of a computer network responsible for maintaining online accounts for users. At some point in time (e.g., when a user is attempting to access a secure area of an online account), the service provider checks a first public cryptocurrency address (block 140) assigned to an online account (e.g., checks the balance, transaction history, etc.) to determine whether a secure area of the account is locked (block 142). When the first public cryptocurrency address indicates the secure area is unlocked, the service provider enables access to the secure area of the online account (block 144). When the first public cryptocurrency address indicates the secure area is locked, the service provider checks a second public cryptocurrency address (block 146) assigned to the online account (e.g., checks the balance, transaction history, etc.) to determine whether a secure area of the account is locked (block 148). When the second public cryptocurrency address indicates the secure area is unlocked, the service provider enables access to the secure area of the online account (block 144). In one embodiment when unlocked using the second public cryptocurrency address, enabling access to a secure area of the online account (block 144) may mean enabling the user to reset the address of at least the first public cryptocurrency address.

In one embodiment, each time the user unlocks a secure area of an online account using either the first public cryptocurrency address or the second public cryptocurrency address, the address may be changed similar to the embodiment described above with reference to FIG. 3B. That is, each time any public cryptocurrency address is used to unlock a secure area of an online account, the address may be changed in order to enhance the security of the system.

Figure 11:
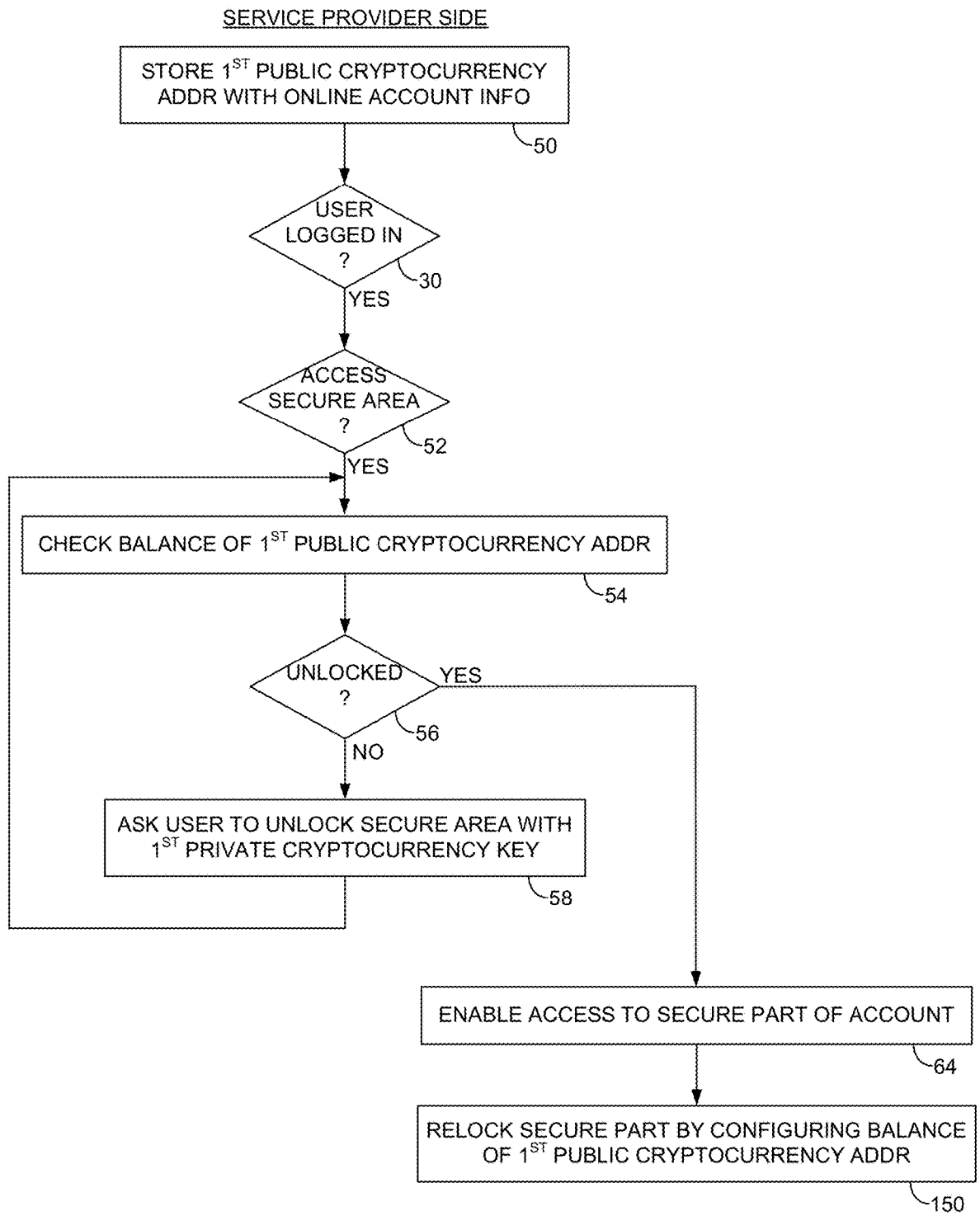
FIG. 11 is a flow diagram according to an embodiment executed at a service provider side of a computer network, wherein after a user accesses at least part of an online account, the service provider automatically relocks at least part of the online account by configuring the balance of a public cryptocurrency address.

FIG. 11 is flow diagram according to an embodiment executed at the service provider side of a computer network responsible for maintaining online accounts for users. FIG. 11 is similar to the embodiment described above with reference to FIG. 3B wherein at least part of a user's online account is relocked based on a second public cryptocurrency address at block 66. Of course, in one embodiment at least part of a user's online account may be relocked based on a previously used public cryptocurrency address received from the user. Referring to FIG. 11, in one embodiment after the user unlocks and accesses at least part of the online account, the service provider relocks the secure area of the online account by configuring the balance of the previously used public cryptocurrency address into the locked state (block 150).

The service provider may configure the balance of a user's public cryptocurrency address into the locked state at any suitable time, such as when the user has finished accessing the secure area of the online account, when the user sends a command over the computer network to the service provider to relock the account, when the user is logged off, etc. The user may be logged off of the online account in any suitable manner, such as the user issuing a command to the service provider to log off of the account, the service provider logging off the user due to inactivity, the service provider logging off the user due to a network error, etc. In one embodiment, a user may configure the balance of the public cryptocurrency address into the unlocked state in order to access a secure area of the online account, but the user need not worry or hassle with relocking the online account knowing that this function is automatically performed by the service provider.

In one embodiment, the user may be accessing an online account at a branch of the service provider (e.g., at a branch of a bank), wherein a service provider representative may be assisting the user, for example, with a withdrawal. Alternatively, the user may be accessing an online account using an automated teller machine (ATM). Regardless as to how the user is accessing an online account, having the service provider automatically relock the online account simplifies the user's experience as well as increases the security of the online account by avoiding a situation where a user may otherwise forget to relock the online account by configuring the balance of the public cryptocurrency address.

Figure 12:
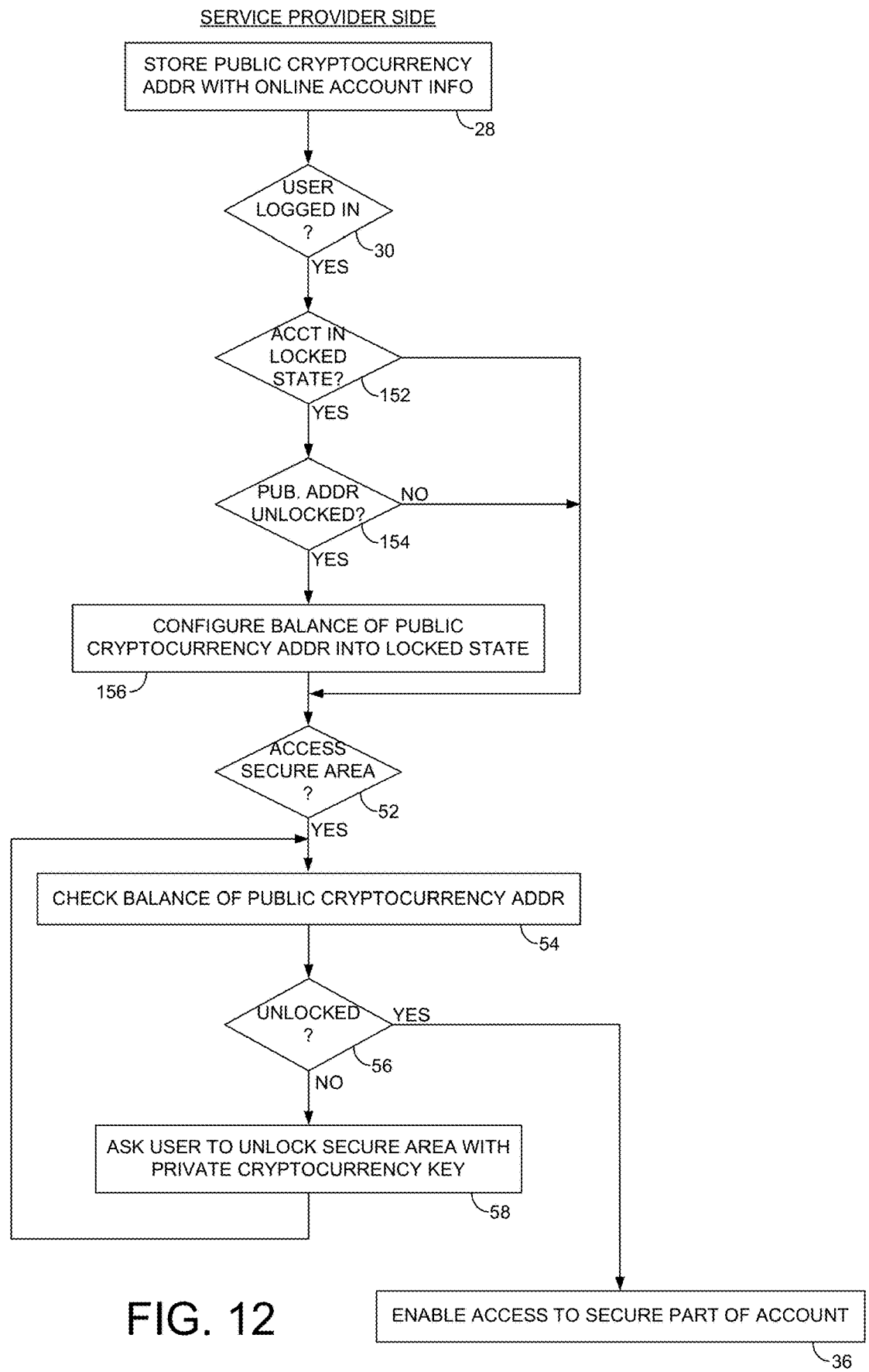
FIG. 12 is a flow diagram according to an embodiment executed at a service provider side of a computer network, wherein when a user logs into an online account and at least part of the online account is in a locked state but a balance of a public cryptocurrency address is in an unlocked state, the service provider automatically relocks the user's online account by configuring the balance of the public cryptocurrency address.

FIG. 12 is flow diagram according to an embodiment executed at the service provider side of a computer network responsible for maintaining online accounts for users. In one embodiment, a user may be able to unlock part of an online account using a public cryptocurrency address after logging into the online account. This embodiment may increase the security of the online account by requiring the user to first establish a secure communication link with the service provider (e.g., by logging into the account) before configuring the balance of a public cryptocurrency address into an unlocked state (by reducing the balance). However, in one embodiment the user may configure the balance before establishing a secure communication link with the service provider (e.g., before logging into the account). If this happens, in one embodiment the service provider may check the locked/unlocked state of the online account after the secure communication link is established, and if the online account is in a locked state but the balance of the public cryptocurrency address is in the unlocked state, the service provider may automatically reconfigure the balance into the locked state. Referring again to FIG. 12, when the user logs into the online account (block 30), the service provider checks whether the secure area of the online account is in the locked state (block 152), for example, due to the user previously locking the secure area. If the secure area of the online account is in the locked state, but the balance of a public cryptocurrency address associated with the online account is in an unlocked state (block 154), the service provider uses the Internet to configure the balance into a locked state (block 156) by increasing the balance. Thereafter the user may unlock the secure area of the online account by reducing the balance of the public cryptocurrency address, thereby ensuring the balance is configured into the unlocked state during a secure communication session.

The embodiment of FIG. 12 may protect against a user from inadvertently configuring the balance of a public cryptocurrency address into an unlocked state prior to establishing a secure communication link with the service provider. For example, the user may inadvertently reduce the balance of a public cryptocurrency address by selecting the wrong address when operating a digital wallet application. Alternatively, in one embodiment the user may not understand that a public cryptocurrency address should be unlocked during a secure communication session with the service provider, and therefore the user may configure the balance of the public cryptocurrency address into the unlocked state before establishing the secure communication link (e.g., before logging into the account). Regardless as to how the balance of a public cryptocurrency address may be prematurely configured into the unlocked state, the embodiment of FIG. 12 helps ensure the balance is automatically reconfigured into the locked state, thereby requiring the user to configure the balance into the unlocked state during a secure communication session, and before enabling access to the secure area of the account.

Referring again to FIG. 3B, in one embodiment a public cryptocurrency address associated with an online account may be changed only during a secure communication session with the service provider (e.g., when logged into the account), and only after the user configures the balance of the current public cryptocurrency address into the unlocked state using the corresponding private cryptocurrency key. In one embodiment, the public cryptocurrency address may be changed each time it is used to unlock a secure area of an online account, thereby realizing the security benefits of a "single-use" public cryptocurrency address as described above. Requiring the public cryptocurrency address to be changed only during a secure communication session and only after unlocking the balance of the current public cryptocurrency address helps protect against hackers attempting to change the public cryptocurrency address to one of their addresses. In one embodiment, the user may use a master address as described above in order to unlock a secure area of an online account (e.g., when a working address is lost), and while the secure area is unlocked, change one or both of the working address and the master address for the account.

The above-described embodiments may be implemented using any suitable computer system, including one or more server computers, one or more personal computers, one or more cell phones, etc. In one embodiment, the flow diagrams shown in the figures may be implemented using a computer system comprising a microprocessor configured to execute steps of a computer program. In one embodiment, the steps of the computer program may be stored on a suitable, non-transient computer readable storage medium, such as a disk drive or a flash memory. In some embodiments, at least some blocks of the flow diagrams may be implemented using the Internet, and in other embodiments at least some blocks of the flow diagrams may be implemented using a cellular network. Other embodiments may employ both the Internet as well as a cellular network in order to implement the various blocks of the flow diagrams. For example, in one embodiment a user may access an online account through the Internet, wherein the public cryptocurrency addresses may be transmitted between the user and the service provider computers using a cellular network in order to increase the security of the system.

What is claimed is:

1. A method of configuring an online account of a user, the method executed at a service provider side of a network of computers, the method comprising:

receiving, by a service provider, a public cryptocurrency address from the user's computer;

associating, by the service provider, the public cryptocurrency address with the online account of the user;

establishing, by the service provider, a secure communication session between the user's computer and the service provider based on the user logging into a first area of the online account of the user;

determining, by the service provider after establishing the secure communication session, that a second area of the online account is in a locked state;

determining, by the service provider, that the user has reduced a balance associated with the public cryptocurrency address during the secure communication session; and in response to determining that the balance associated with the public cryptocurrency address has been reduced during the secure communication session, unlocking, by the service provider, the second area of the online account.

2. The method as recited in claim 1, wherein the user logs into the first area of the online account using a password.

3. The method as recited in claim 1, wherein the user logs into the first area of the online account using a pin number of an automated teller machine (ATM) access card.

4. The method as recited in claim 1, further comprising using, by the service provider, an Internet to increase the balance associated with the public cryptocurrency address when the user is logged off of the online account.

5. The method as recited in claim 4, wherein the user logs into the first area of the online account using a pin number of an automated teller machine (ATM) access card.

6. A computer comprising:

a processor; and a memory comprising non-transitory computer readable instructions, which when executed by the processor cause the processor to perform the steps of:

receiving a public cryptocurrency address from a user's computer;

associating a public cryptocurrency address with an online account of the user;

establishing a secure communication session between the user's computer and the service provider based on the user logging into a first area of the online account of the user;

determining, after establishing the secure communication session, that a second area of the online account is in a locked state;

determining that the user has reduced a balance associated with the public cryptocurrency address during the secure communication session; and in response to determining that the balance associated with the public cryptocurrency address has been reduced during the secure communication session, unlocking the second area of the online account.

7. The computer as recited in claim 6, wherein the user logs into the first area of the online account using a password.

8. The computer as recited in claim 6, wherein the user logs into the first area of the online account using a pin number of an automated teller machine (ATM) access card.

9. The computer as recited in claim 6, wherein the steps further comprise using an Internet to increase the balance associated with the public cryptocurrency address when the user is logged off of the online account.

10. The computer as recited in claim 9, wherein the user logs into the first area of the online account using a pin number of an automated teller machine (ATM) access card.

\* \* \* \* \*